(12) United States Patent
Wang

(10) Patent No.: US 11,906,664 B2
(45) Date of Patent: Feb. 20, 2024

(54) EMISSION MODULE AND MOUNTING AND ADJUSTMENT METHOD OF THE SAME, LIDAR AND SMART SENSING DEVICE

(71) Applicant: SUTENG INNOVATION TECHNOLOGY CO., LTD., Shenzhen (CN)

(72) Inventor: Ji Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 172 days.

(21) Appl. No.: 17/586,716

(22) Filed: Jan. 27, 2022

(65) Prior Publication Data

US 2022/0155422 A1 May 19, 2022

Related U.S. Application Data

(63) Continuation of application No. PCT/CN2019/098161, filed on Jul. 29, 2019.

(51) Int. Cl.
*G01S 7/48* (2006.01)
*G01S 7/481* (2006.01)
(Continued)

(52) U.S. Cl.
CPC ............ *G01S 7/4817* (2013.01); *G01S 7/484* (2013.01); *G01S 7/4813* (2013.01); *G01S 17/931* (2020.01); *G02B 26/0833* (2013.01)

(58) Field of Classification Search
None
See application file for complete search history.

(56) References Cited

U.S. PATENT DOCUMENTS 6,594,092 B2 * 7/2003 von Freyhold ...... G02B 6/4228
359/819
10,222,474 B1 * 3/2019 Raring .................. H01S 5/4087
(Continued)

FOREIGN PATENT DOCUMENTS

CN 107132519 A 9/2017
WO 2018058741 A1 4/2018

OTHER PUBLICATIONS

First Office Action issued in related Chinese Application No. 201980002318.4, dated Mar. 16, 2023, 13 pages.

*Primary Examiner* — Hovhannes Baghdasaryan
(74) *Attorney, Agent, or Firm* — BAYES PLLC

(57) ABSTRACT

Embodiments of the present disclosure provide an emission module and a mounting and adjustment method of the same, a LiDAR and a smart sensing device. An emission module includes an emission apparatus and a collimating element provided sequentially along an outgoing laser, where the emission apparatus is configured to generate the outgoing laser, and the collimating element is configured to collimate the outgoing laser generated by the emission apparatus and emit the outgoing laser; and the collimating element includes a fast-axis collimating element and a slow-axis collimating element provided sequentially along the outgoing laser, the fast-axis collimating element is configured to receive the outgoing laser generated by the emission apparatus and collimate the outgoing laser in a fast-axis direction, and the slow-axis collimating element is configured to receive the outgoing laser collimated in the fast-axis direction, collimate the outgoing laser in the slow-axis direction and emit the outgoing laser.

11 Claims, 15 Drawing Sheets

(51) Int. Cl.
G01S 17/931 (2020.01)
G01S 7/484 (2006.01)
G02B 26/08 (2006.01)

(56) References Cited

U.S. PATENT DOCUMENTS

| | | | | |
|---|---|---|---|---|
| 2007/0262896 A1* | 11/2007 | Turner | ................... | G01S 17/58 342/52 |
| 2009/0153949 A1* | 6/2009 | Kanemoto | ............. | H04B 10/40 228/178 |
| 2018/0284286 A1* | 10/2018 | Eichenholz | ............. | G01S 17/89 |
| 2019/0051233 A1* | 2/2019 | Kweon | .............. | G02B 27/0093 |

* cited by examiner

EMISSION MODULE AND MOUNTING AND ADJUSTMENT METHOD OF THE SAME, LIDAR AND SMART SENSING DEVICE

CROSS-REFERENCE TO RELATED APPLICATION

The present application is a continuation of International Application No. PCT/CN2019/098161, filed on Jul. 29, 2019, which is incorporated herein by reference in its entirety.

TECHNICAL FIELD

Embodiments of the present invention relate to the technical field of a radar, and in particular, to an emission module and a mounting and adjustment method of the same, a LiDAR and a smart sensing device.

BACKGROUND

A LiDAR is a radar system that emits laser beams to obtain characteristics of a target object, such as a position and a speed. A working principle of the LiDAR is that an emission module first emits outgoing beams for detection to the target, a receiving module then receives reflected beams from the target object, and the LiDAR compares the outgoing beams with the reflected beams, to obtain relevant information of the target object after processing, for example, parameters such as distance, azimuth, height, speed, posture, and even shape. The LiDAR includes at least the emission module and the receiving module.

During implementation of the present invention, the inventor of the present invention finds that in the prior art, an emission module of LiDAR includes a plurality of optical components. When the emission module is applied in the LiDAR, the optical components of the emission module need to be adjusted, so that a divergence angle of outgoing beams meet the requirements. In the method, mounting and adjustment is uneasy to implement, causing low mounting and adjustment efficiency.

SUMMARY

In view of the foregoing shortcomings of the prior art, embodiments of the present invention mainly aim to provide an emission module and a mounting and adjustment method of the same, a LiDAR and a smart sensing device, to resolve a problem of low mounting and adjustment efficiency in the prior art.

A technical solution used in the embodiments of the present invention is as follows: providing an emission module, which includes an emission apparatus and a collimating element provided sequentially along an outgoing laser, where the emission apparatus is configured to generate the outgoing laser, and the collimating element is configured to collimate the outgoing laser generated by the emission apparatus and emit the outgoing laser; and the collimating element includes a fast-axis collimating element and a slow-axis collimating element provided sequentially along the outgoing laser, the fast-axis collimating element is configured to receive the outgoing laser generated by the emission apparatus and collimate the outgoing laser in a fast-axis direction, and the slow-axis collimating element is configured to receive the outgoing laser collimated in the fast-axis direction, collimate the outgoing laser in the slow-axis direction and emit the outgoing laser.

Optionally, the fast-axis collimating element includes a fast-axis collimating lens, and the slow-axis collimating element includes a slow-axis collimating lens.

Optionally, the fast-axis collimating lens is an aspherical cylindrical lens, and the slow-axis collimating lens is a spherical cylindrical lens.

Optionally, a generatrix direction of the fast-axis collimating lens is perpendicular to that of the slow-axis collimating lens.

Optionally, a capability of the fast-axis collimating lens for focusing outgoing lasers is greater than a capability of the slow-axis collimating lens for focusing outgoing lasers.

Optionally, the fast-axis collimating lens is provided in a fast-axis collimating lens holder; and the slow-axis collimating lens is provided in a slow-axis collimating lens holder.

Optionally, the emission module further includes a base, and both the fast-axis collimating lens holder and the slow-axis collimating lens holder are fixed to the base.

Optionally, the fast-axis collimating lens holder includes a first vertical plate, and a first mounting aperture for vertically providing the fast-axis collimating lens is arranged on the first vertical plate.

Optionally, the fast-axis collimating lens holder further includes a first side baffle, a second side baffle, and a top baffle that extend perpendicular to the first vertical plate. The first side baffle, the top baffle and the second side baffle are sequentially connected, to form a hollow framework.

Optionally, the fast-axis collimating lens holder further includes a first fixing plate extending horizontally from the bottom of the first vertical plate, the first side baffle, and the second side baffle, and the first fixing plate connects the fast-axis collimating lens holder to the base.

Optionally, the fast-axis collimating lens holder further includes a pressing plate, and the pressing plate is provided in front of the first mounting aperture and is configured to fix the fast-axis collimating lens.

Optionally, the slow-axis collimating lens holder includes a second vertical plate, and a second mounting aperture for vertically providing the fast-axis collimating lens is arranged on the second vertical plate.

Optionally, the slow-axis collimating lens holder further includes a third fixing plate extending horizontally from the bottom of the second vertical plate, and the third fixing plate connects the slow-axis collimating lens holder to the base.

Optionally, the slow-axis collimating lens holder further includes a third side baffle and a fourth side baffle that extend perpendicular to the second vertical plate. The third side baffle, the second vertical plate, and the fourth side baffle are sequentially connected, to form a framework of a U-shape.

Optionally, the collimating element further includes a fixing base, and the fast-axis collimating lens and the slow-axis collimating lens are fixed to the fixing base, and are fixed to the base through the fixing base.

Optionally, the emission apparatus includes an emission plate assembly and an emission-plate-mounting base, the emission plate assembly is fixed to the emission plate mounting base, and the emission plate assembly is fixed to the base through the emission plate mounting base.

Optionally, the emission plate assembly includes an emission plate, an emission plate adjustment cover, and an emission plate adjustment base. The emission plate adjustment cover and the emission plate adjustment base clamp the emission plate; and the emission plate mounting base is provided with a mounting rail matching the emission plate adjustment base of the emission plate assembly, and the emission plate assembly is mounted in the mounting rail and fixed to the emission plate mounting base.

An embodiment of the present invention further provides a mounting and adjustment method of an emission module. The method is applied to the foregoing emission module, and the method includes: adjusting a distance between a fast-axis collimating lens and a slow-axis collimating lenses, aligning an optical axis of the fast-axis collimating lens with that of the slow-axis collimating lens, and fixing the fast-axis collimating lens and the slow-axis collimating lens to the base, to obtain the collimating element; adjusting positions of the emission apparatus and the collimating element; and when a divergence angle of the collimated outgoing light beam is not greater than a preset divergence angle threshold, fixing the emission apparatus to the base, to obtain an emission module.

An embodiment of the present invention further provides a LiDAR, including the foregoing emission module, a beam splitting module, and a receiving module, where the emission module is configured to emit a collimated outgoing laser, the beam splitting module is configured to enable the outgoing laser to be emitted into a detection region after passing through, and deflect a reflected laser in a coaxial optical path with the outgoing laser toward the receiving module, and the receiving module is configured to receive the reflected laser.

Optionally, the emission module, the beam splitting module, and the receiving module are provided in an integrated transceiver housing. The emission module, the beam splitting module, and the receiving module are positioned and fixed by a preset structure.

An embodiment of the present invention further provides a smart sensing device, including the foregoing LiDAR.

Beneficial effects of the embodiments of the present invention are as follows: Different from a case in the prior art, the emission apparatus and the collimating element are sequentially provided along the outgoing laser in the emission module provided in the embodiments of the present invention, and the emission apparatus and the collimating element are integrated to obtain a modular emission module. The emission module can be easily applied in a LiDAR product, and the mounting and adjustment is convenient and efficient. In addition, the fast-axis collimating element and the slow-axis collimating element are provided sequentially in the collimating element along the outgoing laser, to collimate the fast and slow axes of the outgoing laser separately. The fast-axis collimating element does not deflect light in a slow-axis direction, nor does the slow-axis collimating element deflect light in a fast-axis direction. Two axes do not affect each other and are not cross coupled, which makes it easier to implement light adjustment.

BRIEF DESCRIPTION OF THE DIAGRAMS

One or more embodiments are described by using examples with reference to diagrams in drawings corresponding to the embodiments. These exemplary descriptions do not constitute a limitation to the embodiments. Elements with the same reference signs in the drawings indicate similar elements. Unless otherwise stated, the diagrams in the drawings do not constitute a proportional limitation.

Figure 1:
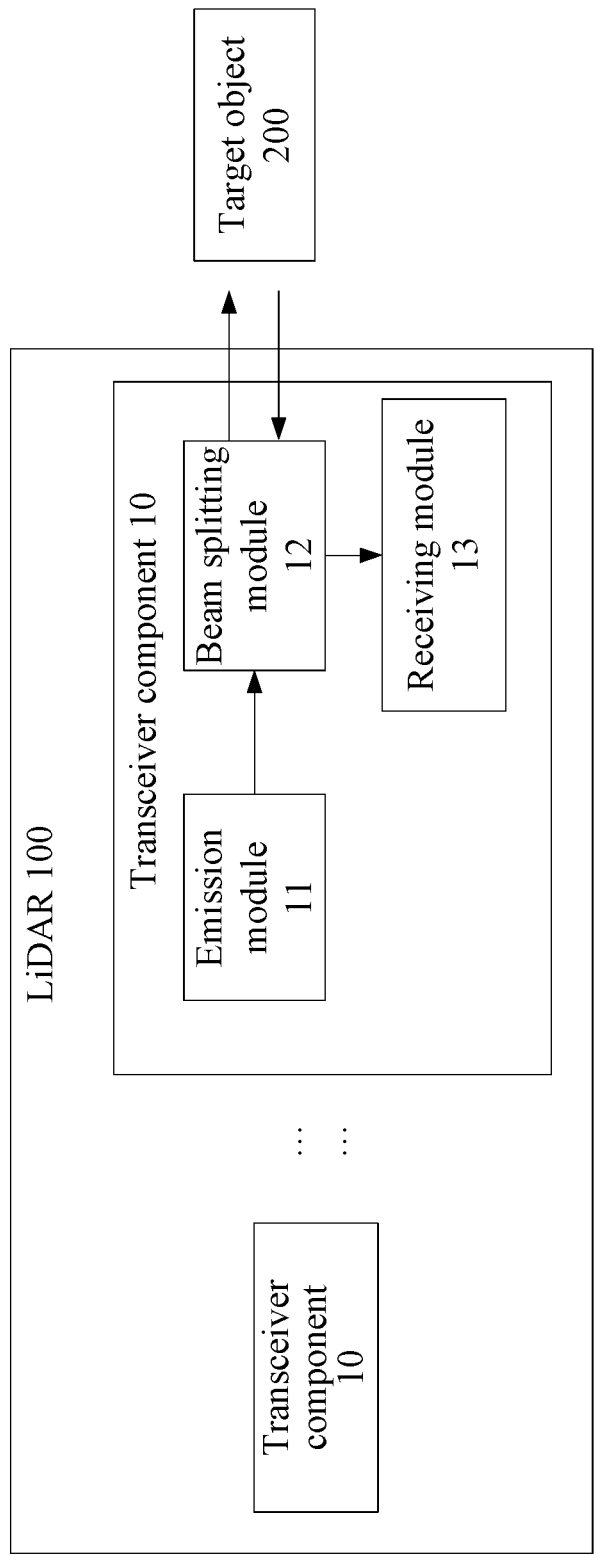
FIG. 1 is a structural block diagram of a LiDAR according to an embodiment of the present invention.

Reference signs in the specific embodiments are as follows:

LiDAR 100; target object 200; transceiver component 10; emission module 11; beam splitting module 12; receiving module 13; reflector module 14; focusing module 15; emission apparatus 111; collimating element 112; emission plate 1111; emission plate assembly 1112; emission plate mounting base 1113; emission plate adjustment cover 1112*a*; emission plate adjustment base 1112*b*; mounting rail 1113*a*; fast-axis collimating lens 1121; slow-axis collimating lens 1122; fast-axis collimating lens holder 1124; slow-axis collimating lens holder 1125; first vertical plate 1124A; first mounting aperture 1124B; first side baffle 1124C; second side baffle 1124D; top baffle 1124F; pressing plate 1124G; first fixing plate 1124E; second vertical plate 1125A; second mounting aperture 1125B; third side baffle 1125C; fourth side baffle 1125D; third fixing plate 1125E; beam splitter support element 121; lock block 122; receiving plate base 131; reflector support element 141; reflector cover 142; focusing lens barrel 151; base 20; emission module 31; emission optical system 32; beam splitting module 33; reflector module 34; receiving optical system 35; and receiving module 36.

DESCRIPTION OF THE INVENTION

Embodiments of the technical solution of the present invention are described in detail below in conjunction with the drawings. The following embodiments are only used to describe the technical solutions of the present invention more clearly, hence are only used as examples, and cannot be used to limit the protection scope of the present invention.

It should be noted that unless otherwise specified, the technical or scientific terms used in the present invention should have general meanings understood by a person of ordinary skill in the art to which the present invention belongs.

In the description of the present invention, it should be understood that orientations or position relationships indicated by terms such as "center," "longitudinal," "lateral," "length," "width," "thickness," "above," "under," "front," "rear," "left," "right," "vertical," "horizontal," "top," "bottom," "inner," "outer," "clockwise," "counterclockwise," "axial," "radial," and "circumferential" are based on the orientations or position relationships shown in the drawings, are merely intended to describe the present invention and simplify the descriptions, but are not intended to indicate or imply that the indicated device or element shall have a specific orientation or be formed and operated in a specific orientation, and therefore cannot be understood as a limitation to the present invention.

In addition, the terms such as "first" and "second" are merely intended for a purpose of description, and shall not be understood as an indication or implication of relative importance or implicit indication of a quantity of indicated technical features. In the description of the present invention, "a plurality of" means two or more, unless otherwise specifically defined.

In the present invention, unless otherwise clearly specified and limited, terms such as "mounting," "connected," "connection," and "fixing" shall be understood in a general sense. For example, these technical terms may be a fixed connection, a detachable connection, or an integrated connection; or may be a mechanical connection or an electrical connection; or may be a direct connection, an indirect connection by using an intermediate medium, or an internal communication of two elements or an interaction of two elements. A person of ordinary skill in the art may understand specific meanings of the foregoing terms in the present invention according to a specific situation.

In the present invention, unless otherwise clearly specified and defined, that a first feature is "above" or "under" a second feature may mean that the first feature and the second feature are in direct contact, or the first feature and the second feature are in indirect contact through an intermediate medium. Moreover, that a first feature is "above," "over," and "on" a second feature may mean that the first feature is right above or diagonally above the second feature, or may merely indicate that a horizontal height of the first feature is greater than that of the second feature. That a first feature is "below," "under," and "beneath" a second feature may mean that the first feature is right below or diagonally below the second feature, or may merely indicate that a horizontal height of the first feature is less than that of the second feature.

FIG. 1 is a structural block diagram of a LiDAR according to an embodiment of the present invention. As shown in FIG. 1, LiDAR 100 includes at least one transceiver component 10. The transceiver component 10 includes an emission module 11, a beam splitting module 12, and a receiving module 13, where the emission module 11 is configured to emit a collimated outgoing laser, the beam splitting module 12 is configured to enable the outgoing laser to be emitted into a detection region after passing through, and deflect a reflected laser in a coaxial optical path with the outgoing laser toward the receiving module 13, and the receiving module 13 is configured to receive the reflected laser. The reflected laser is the laser returned after the outgoing laser is reflected by an object in a detection region.

The LiDAR 100 further includes a base 20, and at least one transceiver component 10 is fixed to the base 20 in a mounting angle. When each transceiver component 10 is mounted on the base 20, there is a corresponding mounting angle, and each transceiver component 10 is mounted on the base 20 in accordance with the corresponding angle. In addition, a material and shape of the base 20 can be selected based on an actual situation. This is not limited in this embodiment.

The emission module 11 is aligned with the beam splitting module 12 and fixed to the base 20. When the emission module 11 and the beam splitting module 12 are fixed to the base 20, the emission module 11 needs to be aligned with the beam splitting module 12, so that an outgoing laser emitted by the emission module 11 can be directed toward the beam splitting module 12, and then the emission module 11 and the beam splitting module 12 are fixed; or either of the emission module 11 and the beam splitting module 12 is first fixed, then a position of the other component is adjusted, so that the outgoing laser emitted by the emission module 11 can be directed toward the beam splitting module 12, and then the emission module 11 and the beam splitting module 12 are fixed. In addition, the emission module 11 and the base 20 may be connected by means of a buckle, a thread (for example, a screw or a bolt), a pin, or an adhesive, and the like.

Herein, the LiDAR 100 can include one or more transceiver assemblies 10. The specific number of the transceiver assemblies 10 may depend on an actual need. This is not limited in this embodiment. Each transceiver component 10 has a limited horizontal field of view. When the LiDAR 100 needs a larger horizontal field of view, for example, when the LiDAR 100 needs to reach a horizontal field of view of 120°, the LiDAR 100 can use four transceiver assemblies 10 with an angle of view of 30°, and a plurality of transceiver assemblies 10 are spliced in a horizontal direction.

Specifically, the outgoing laser emitted by the emission module 11 of the LiDAR 100 is emitted to the detection region after passing through the beam splitting module 12. When there is a target object 200 in the detection region, the outgoing laser is reflected by the target object 200 to obtain the reflected laser. When returning, the reflected laser enters the beam splitting module 12, and the beam splitting module 12 deflects the reflected laser toward the receiving module 13, so that the reflected laser is received by the receiving module 13.

A specific structure of the emission module 11 is described in detail below.

Figure 2:
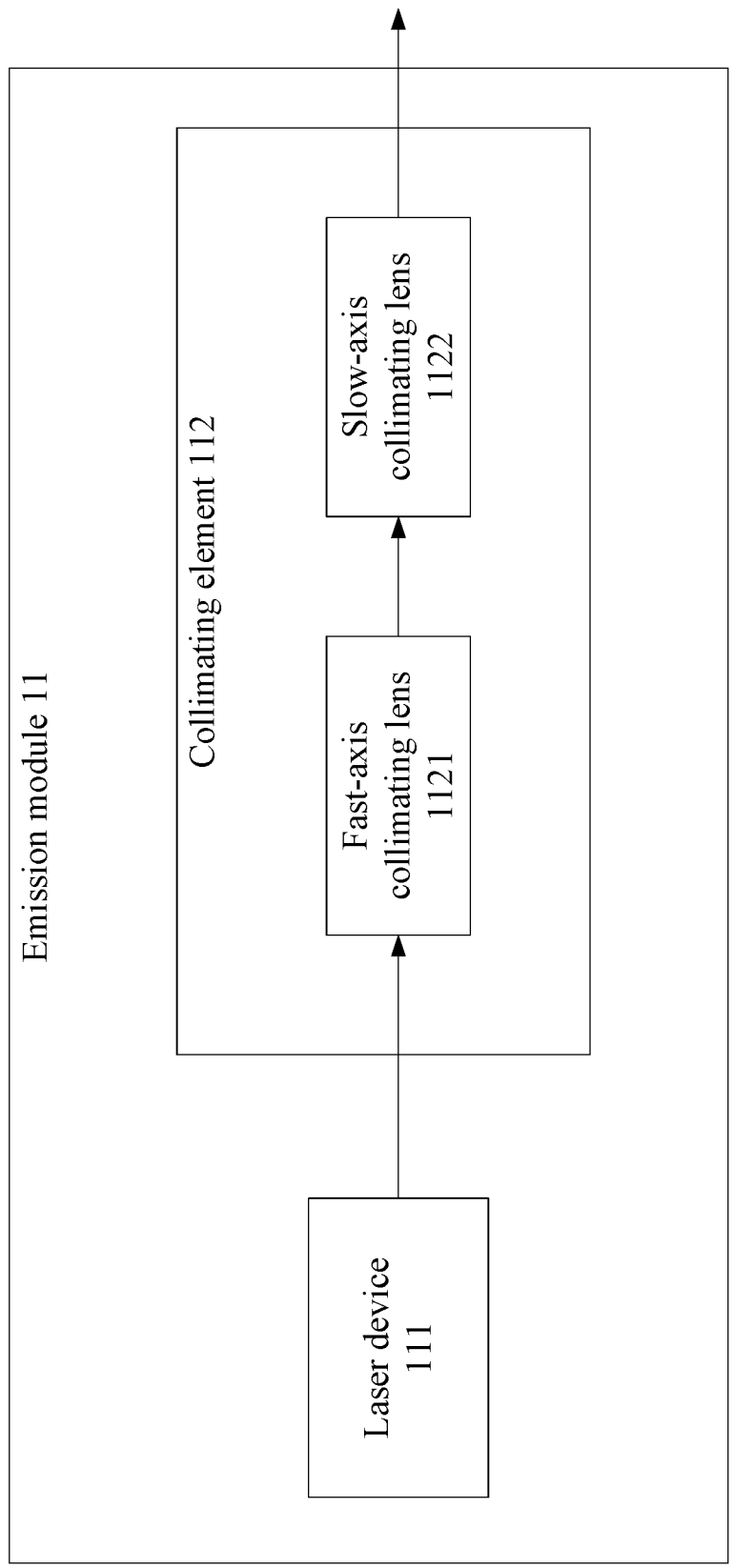
FIG. 2 is a structural block diagram of an emission module according to an embodiment of the present invention.
Figure 3:
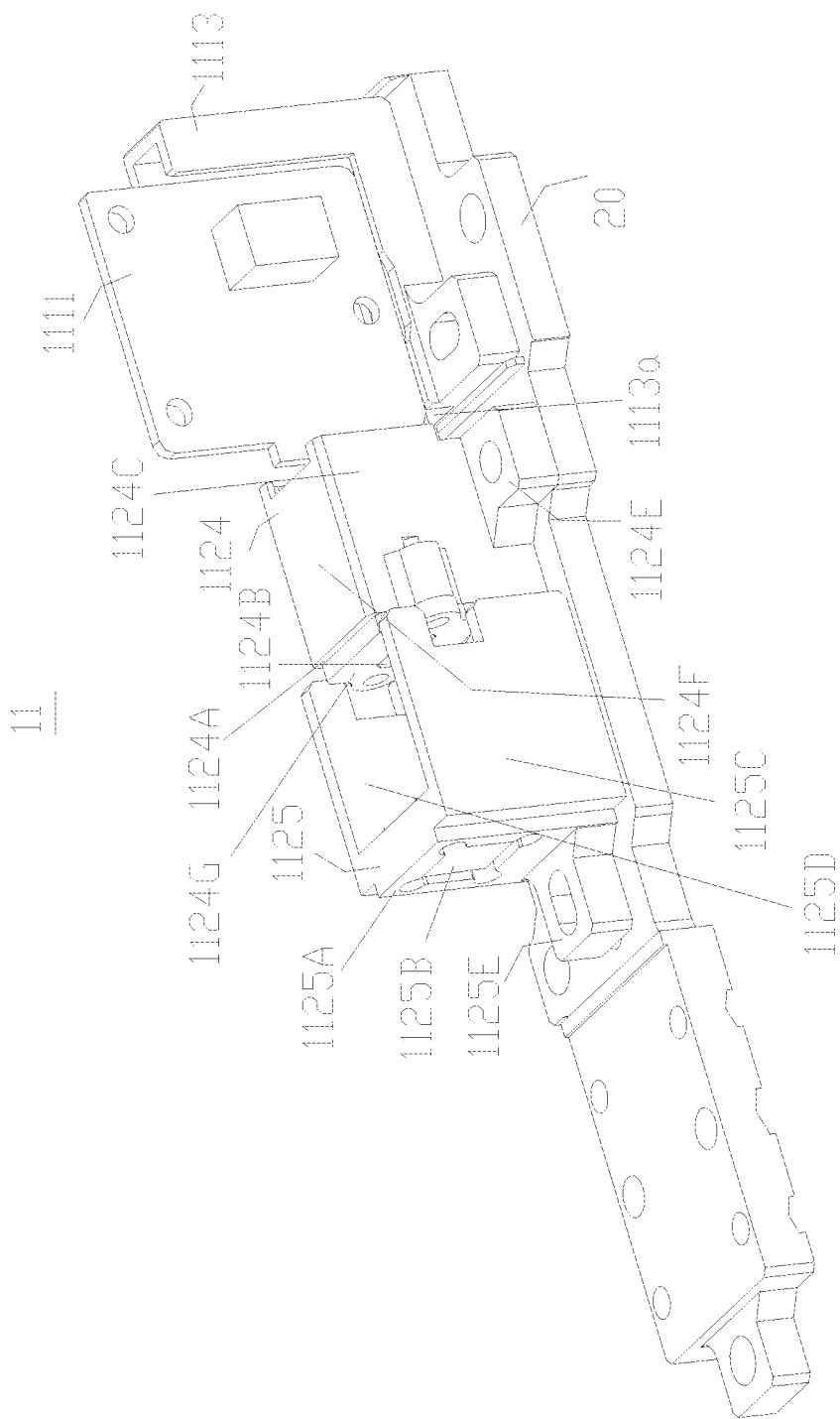
FIG. 3 is a schematic structural diagram of an emission module according to an embodiment of the present invention.

FIG. 2 is a structural block diagram of an emission module according to an embodiment of the present invention. FIG. 3 is a schematic structural diagram of an emission module according to an embodiment of the present invention. As shown in FIG. 2 and FIG. 3, the emission module 11 includes an emission apparatus 111 and a collimating element 112 provided sequentially along an outgoing laser. The emission apparatus 111 is configured to generate the outgoing laser, and the collimating element 112 is configured to collimate the outgoing laser generated by the emission apparatus 111 and then emit the outgoing laser. The collimating element 112 is provided between the emission module 11 and the beam splitting module 12. Emitted beams are directed toward the beam splitting module 12 after being collimated by the collimating element 112. Positions of the emission apparatus 111 and the collimating element 112 are relatively fixed.

Figure 14:
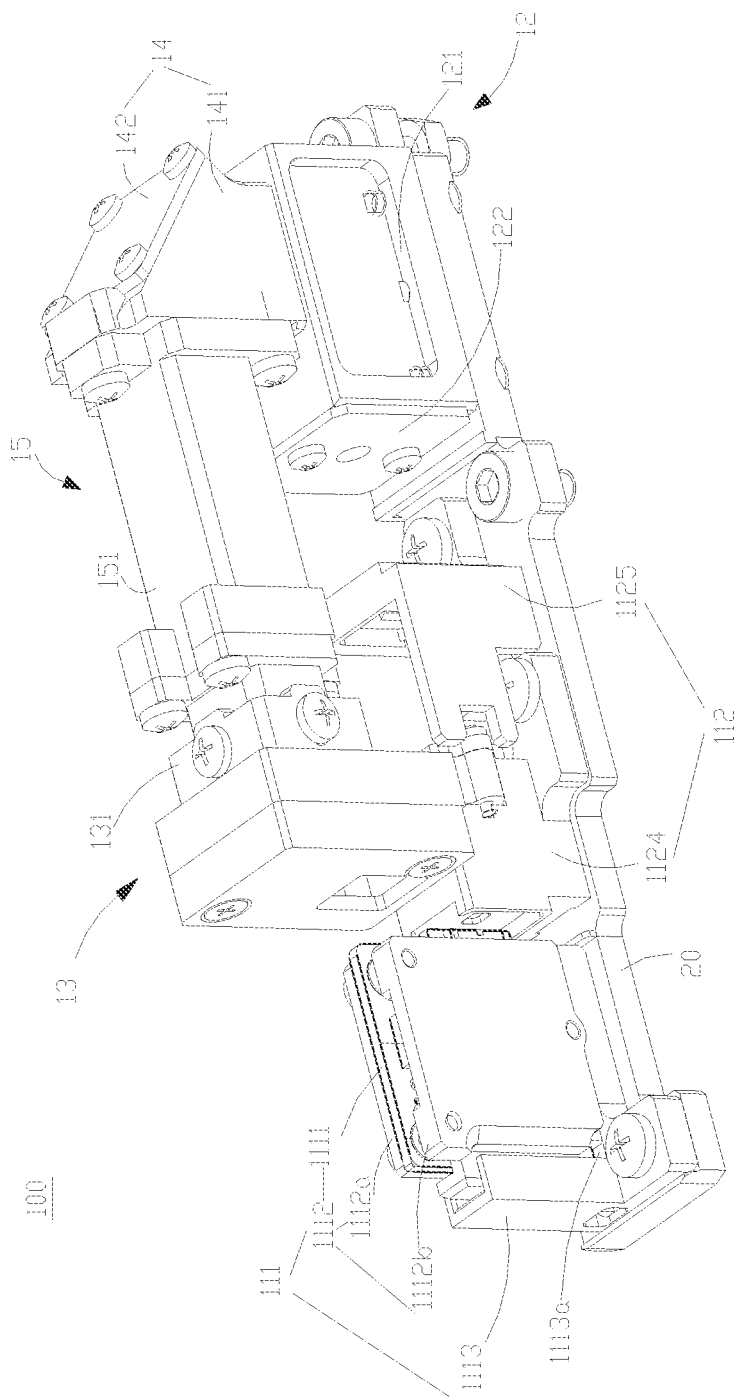
FIG. 14 is a schematic structural diagram of a LiDAR according to an embodiment of the present invention.

As shown in FIG. 3 and FIG. 14, the emission apparatus 111 is fixed to the base 20. Optionally, the emission apparatus 111 includes either of the following: a semiconductor emission apparatus and a fiber emission apparatus. In this embodiment, the emission apparatus 111 includes an emission plate assembly 1112 and an emission plate mounting base 1113. The emission plate assembly 1112 is fixed to the emission plate mounting base 1113, and the emission plate assembly 1112 is fixed to the base 20 through the emission plate mounting base 1113. The emission plate assembly 1112 includes an emission plate 1111, an emission plate adjustment cover 1112a, and an emission plate adjustment base 1112b. The emission plate adjustment cover 1112a and the emission plate adjustment base 1112b clamp the emission plate 1111. The emission plate mounting base 1113 is provided with a mounting rail 1113a matching the emission plate assembly 1112, and the emission plate assembly 1112 is mounted in the mounting rail 1113a and fixed to the emission plate mounting base 1113.

A fixing manner of the emission plate mounting base 1113 and the base 20 includes one or more of buckle fixing, thread fixing, pin fixing and adhesive fixing.

The collimating element 112 includes a fast-axis collimating element and a slow-axis collimating element provided sequentially along the outgoing laser, the fast-axis collimating element is configured to receive the outgoing laser generated by the emission apparatus 111 and collimate the outgoing laser in a fast-axis direction, and the slow-axis collimating element is configured to receive the outgoing laser collimated in the fast-axis direction, collimate the outgoing laser in the slow-axis direction and emit the outgoing laser.

A size and divergence angle of an outgoing light spot in a fast-axis direction of the emission apparatus 111 are different from those in a slow-axis direction. During actual application, the fast and slow axes are corresponding to horizontal and vertical directions respectively, and far-field light spots in the two directions are adjusted in specific proportion according to actual need. To implement different effects in the two directions respectively, focal lengths of which in the fast-axis collimating element and slow-axis collimating element of the emission apparatus 111 need to be different. In the prior art, the fast-axis and slow-axis collimation may be implemented through a group of a fiber and ball lens, a group of ball lenses only, and the like. When the group of a fiber and ball lens are used, light adjustment is difficult to implement because the fiber is small, and a light adjustment standard is uneasy to formulate. When the group of ball lenses are used, focal lengths of which in the fast-axis and slow-axis directions are the same, and a ratio of far-field light spots cannot be customized.

Therefore, in view of the foregoing problem, an improved collimating element 112 is designed in this embodiment of the present invention. In this embodiment of the present invention, the collimating element 112 includes a fast-axis collimating lens 1121 and a slow-axis collimating lens 1122 provided sequentially along the outgoing laser. The fast-axis collimating lens 1121 is an aspherical cylindrical lens and a positive lens with at least one cylindrical surface, and is configured to collimate light in the fast-axis direction. The slow-axis collimating lens 1122 is an aspherical cylindrical lens and a positive lens with at least one cylindrical surface, and is configured to collimate light in the slow-axis direction. Positions of the fast-axis collimating lens 1121 and the slow-axis collimating lens 1122 are relatively fixed, and a distance between the fast-axis collimating lens 1121 and the slow-axis collimating lens 1122 can be set to 10 to 100 mm, or preferably 20 mm, 30 mm, or 40 mm. Because the positions of the emission apparatus 111 and the collimating element 112 are relatively fixed, the positions of the emission apparatus 111, the fast-axis collimating lens 1121 and the slow-axis collimating lens 1122 are all relatively fixed. As modular integrity, the fixed emission module 11 can be mounted on the LiDAR 100.

The fast-axis collimating lens 1121 is provided in the fast-axis collimating lens holder 1124, and the fast-axis collimating lens holder 1124 is fixed to the base 20; and the slow-axis collimating lens 1122 is provided in the slow-axis collimating lens holder 1125, and the slow-axis collimating lens holder 1125 is fixed to the base 20. A fixing manner of the fast-axis collimating lens holder 1124, the fast-axis collimating lens holder 1125, and the base 20 includes one or more of buckle fixing, thread fixing, pin fixing, and adhesive fixing.

Figure 4:
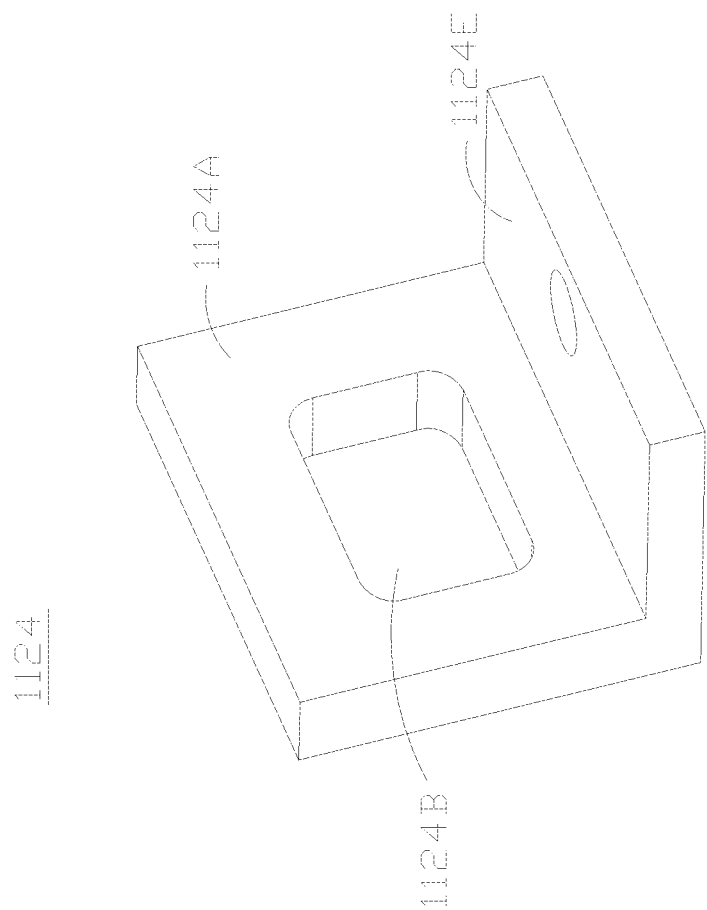
FIG. 4 is a schematic structural diagram of a fast-axis collimating lens holder according to an embodiment of the present invention.

Referring to FIG. 4, FIG. 4 is a schematic structural diagram of a fast-axis collimating lens holder according to an embodiment of the present invention. In this embodiment, the fast-axis collimating lens holder 1124 includes a first vertical plate 1124A. A first mounting aperture 1124B for vertically providing the fast-axis collimating lens 1121 is arranged on the first vertical plate 1124A. The fast-axis collimating lens holder 1124 further includes a first fixing plate 1124E extending horizontally from the bottom of the first vertical plate 1124A, and the first fixing plate 1124E connects the fast-axis collimating lens holder 1124 to the base 20.

Figure 5:
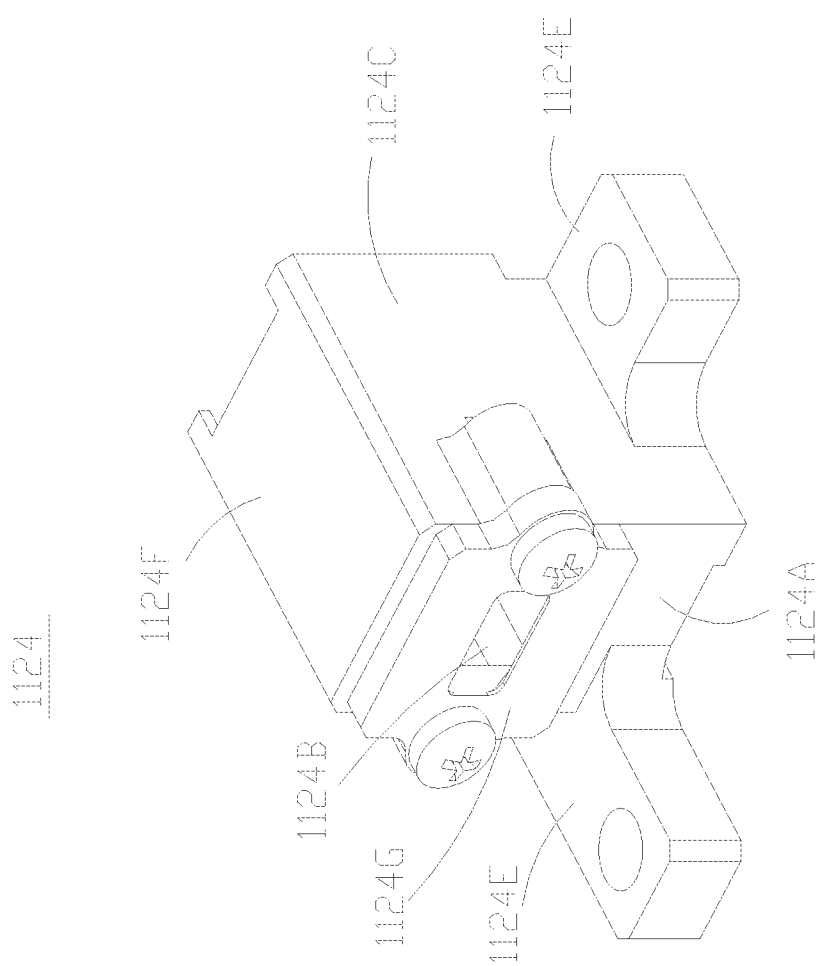
FIG. 5 is a schematic structural diagram of a fast-axis collimating lens holder according to another embodiment of the present invention.
Figure 8:
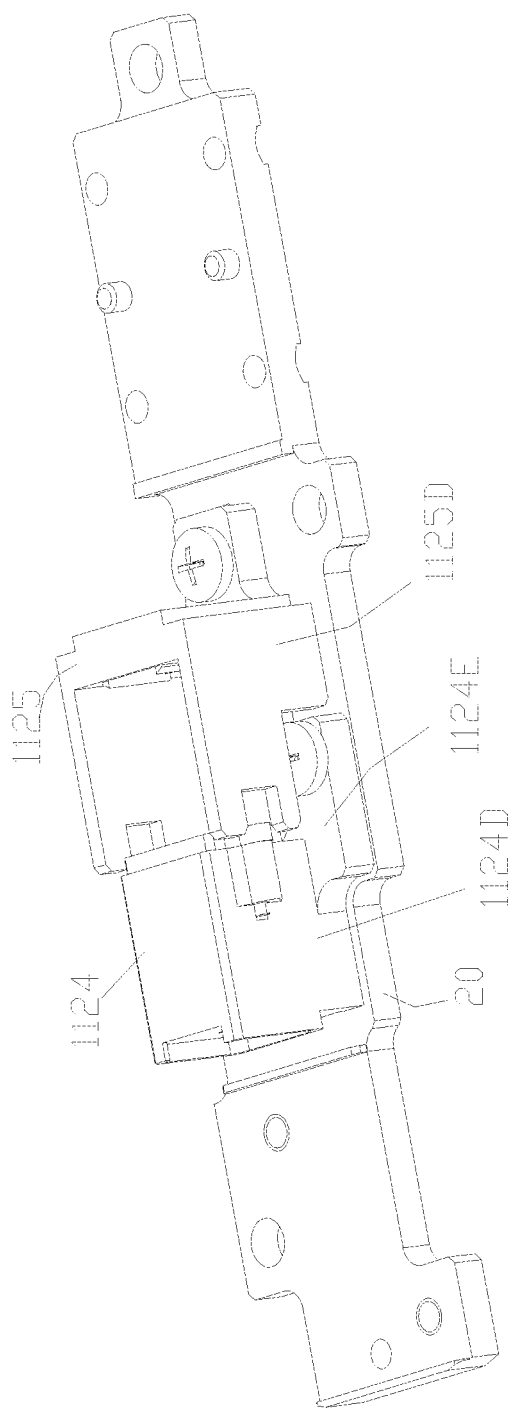
FIG. 8 is a schematic structural diagram of a base holding a fast-axis collimating lens holder and a slow-axis collimating lens holder.

As shown in FIG. 5 and FIG. 8, in another embodiment, the fast-axis collimating lens holder 1124 further includes a first side baffle 1124C, a second side baffle 1124D, and a top baffle 1124F that extend perpendicular to the first vertical plate 1124A. The first side baffle 1124C, the top baffle 1124F and the second side baffle 1124D are sequentially connected, to form a hollow framework. The first fixing plate 1124E extends horizontally from the bottom of the first vertical plate 1124A, the first side baffle 1124C, and the second side baffle 1124D, and the first fixing plate 1124E connects the fast-axis collimating lens holder 1124 to the base 20. The fast-axis collimating lens holder 1124 further includes a pressing plate 1124G, and the pressing plate 1124G is provided in front of the first mounting aperture 1124B and is configured to fix the fast-axis collimating lens 1121.

Figure 6:
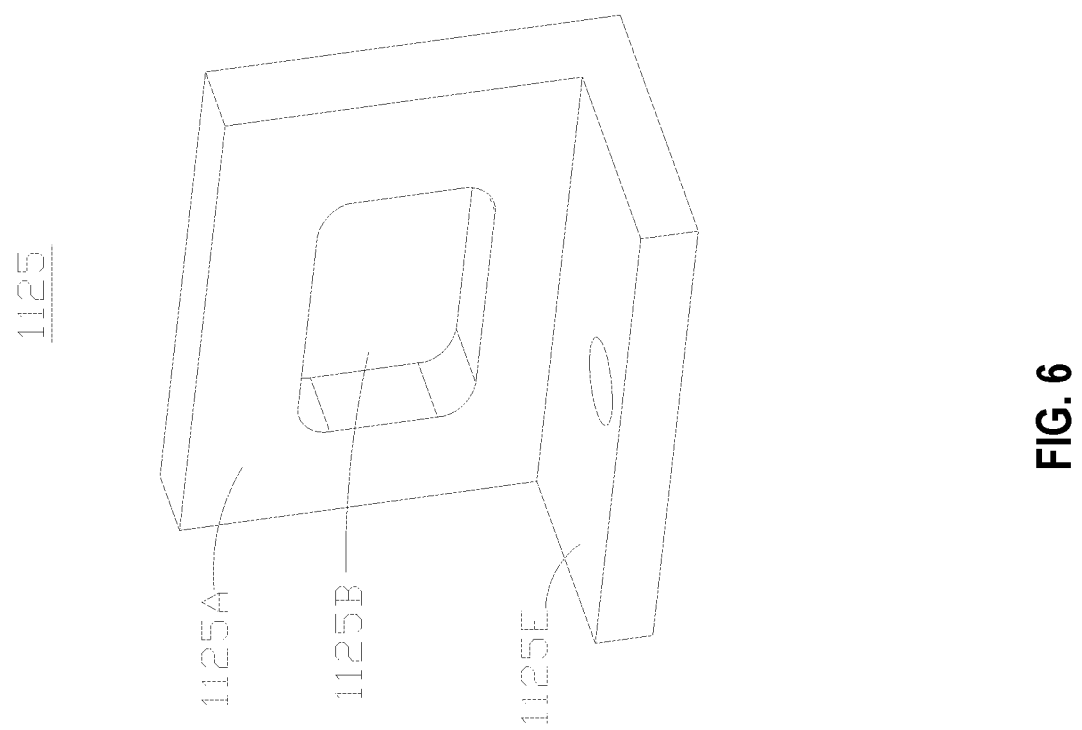
FIG. 6 is a schematic structural diagram of a slow-axis collimating lens holder according to an embodiment of the present invention.

Referring to FIG. 6, FIG. 6 is a schematic structural diagram of a slow-axis collimating lens holder according to an embodiment of the present invention. The slow-axis collimating lens holder 1125 includes a second vertical plate 1125A. A second mounting aperture 1125B for vertically providing the slow-axis collimating lens 1122 is arranged on the second vertical plate 1125A. The slow-axis collimating lens holder 1125 further includes a third fixing plate 1125E extending horizontally from the bottom of the second vertical plate 1125A, and the third fixing plate 1125E connects the slow-axis collimating lens holder 1125 to the base 20.

Figure 7:
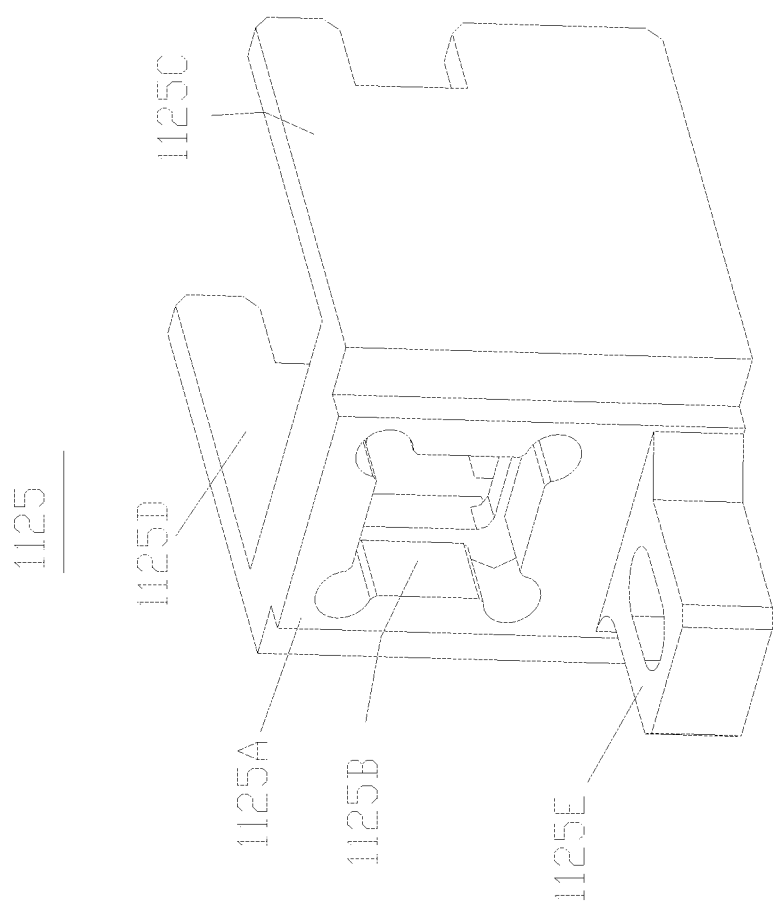
FIG. 7 is a schematic structural diagram of a slow-axis collimating lens holder according to another embodiment of the present invention.

As shown in FIG. 7 and FIG. 8, in another embodiment, the slow-axis collimating lens holder 1125 further includes a third side baffle 1125C and a fourth side baffle 1125D that extend perpendicular to the second vertical plate 1125A. The third side baffle 1125C, the second vertical plate 1125A, and the fourth side baffle 1125D are sequentially connected, to form a framework of a U-shape.

The fast-axis collimating lens holder 1124 and the slow-axis collimating lens holder 1125 are designed as frame structures. A side plate of the frame structures can block light, thereby preventing crosstalk between outgoing lasers of two adjacent transceiver assemblies 10 and avoiding mutual influence. For example, a laser device of a first transceiver component 10 emits an outgoing laser in a large divergence angle, and the outgoing laser emitted is prone to diffuse to both sides and enter a collimating reflector of an adjacent transceiver component 10.

In some embodiments, the collimating element 112 may further include a fixing base (not shown in the figure), the fast-axis collimating lens holder 1124 and the slow-axis collimating lens holder 1125 are fixed to the fixing base, and the fixing base is fixed to the base 20.

The fast-axis collimating lens 1121 is one of a plano-convex cylindrical lens, a convex-plano cylindrical lens, a convex-convex cylindrical lens, a convex-concave cylindrical lens, and a concave-convex cylindrical lens. The slow-axis collimating lens 1122 is one of a plano-convex cylindrical lens, a convex-plano cylindrical lens, a convex-convex cylindrical lens, a convex-concave cylindrical lens, and a concave-convex cylindrical lens.

Figure 9:
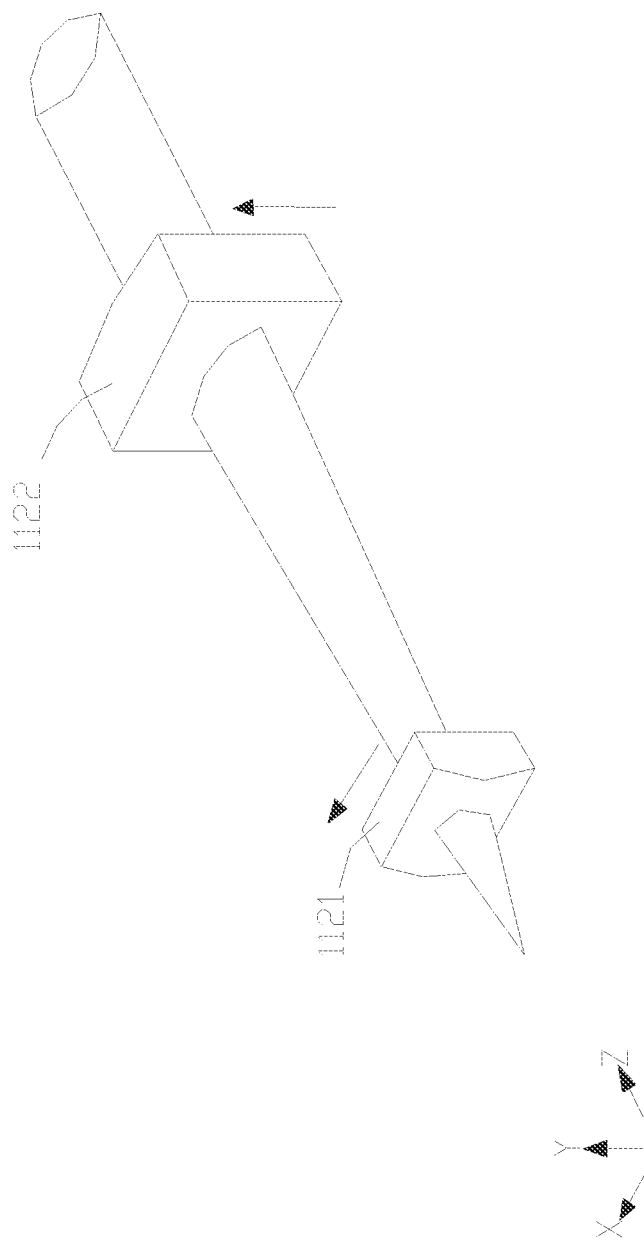
FIG. 9 is a schematic diagram of a stereoscopic optical path according to an embodiment of the present invention.

A generatrix direction of the fast-axis collimating lens 1121 is perpendicular to that of the slow-axis collimating lens 1122. FIG. 9 is a schematic diagram of a stereoscopic optical path according to an embodiment of the present invention. As shown in FIG. 9, the fast-axis collimating lens 1121 in this embodiment uses a convex-plano cylindrical lens, the slow-axis collimating lens 1122 uses a plano-convex cylindrical lens, generatrix directions of the fast-axis collimating lens 1121 and the slow-axis collimating lens 1122 are denoted by arrows shown in FIG. 9, and the two generatrix directions are perpendicular to each other.

Figure 10:
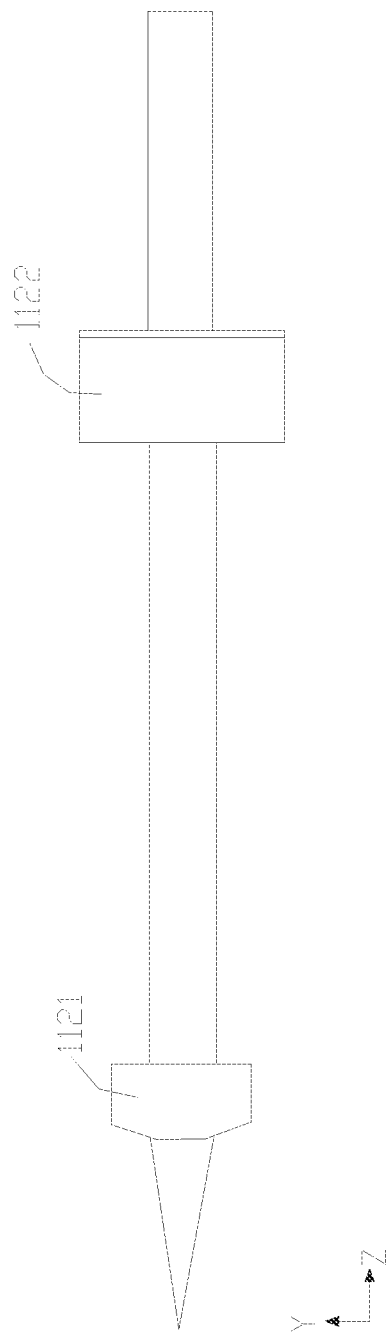
FIG. 10 is a schematic diagram of an optical path in a fast-axis direction according to an embodiment of the present invention.
Figure 11:
FIG. 11 is a schematic diagram of an optical path in a slow-axis direction according to an embodiment of the present invention.

FIG. 10 is a schematic diagram of an optical path in a fast-axis direction according to an embodiment of the present invention. FIG. 11 is a schematic diagram of an optical path in a slow-axis direction according to an embodiment of the present invention. As shown in FIG. 10, an aspheric cylindrical lens in the fast-axis direction collimates light in the fast-axis direction. By this time, light in Y direction is already collimated light, light in X direction continues diverging, and the collimated light in the Y direction passes through the spherical cylindrical lens in the slow axis without being changed. Then, as shown in FIG. 11, the spherical cylindrical lens in the slow-axis direction collimates the light in the X direction, and the light is the collimated light in both the X and Y directions.

The light in the fast-axis direction is independent of that in the slow-axis direction. The lens in the slow axis does not deflect the light in the fast-axis direction, and the lens in the fast axis does not deflect the light in the slow-axis direction. An initial light divergence angle in the fast-axis direction is relatively large, and it is difficult to focus light. In the embodiments of the present invention, a capability of the fast-axis collimating lens 1121 for focusing the outgoing lasers is greater than a capability of the slow-axis collimating lens 1122 for focusing the outgoing lasers, and the aspherical cylindrical lens is used in the fast-axis direction, to prevent the light spot emitted to the far field from excessive divergence. In addition, light is collimated separately in the fast axis and the slow axis, so that a scale of a far-field light spot can be randomly defined in design stage. Only one lens is used for each axis, which facilitates mounting and adjustment.

Further, when an emission module 11 is mounted and adjusted, an emission apparatus 111 can be enabled to first emit a laser beam, and the laser beam is emitted after being collimated by a collimating element 112. When the emission module 11 is adjusted, the size of a light spot of the collimated outgoing laser can be measured, to calculate a divergence angle. When the divergence angle is not greater than a preset divergence angle threshold, it can be determined that the current emission module 11 has been completely adjusted, otherwise positions of an emission plate 1111 and the collimating element 112 continue to be adjusted, so that a divergence angle of the final collimated laser beam is not greater than the preset divergence angle threshold.

The mounting and adjustment method includes: disposing the fast-axis collimating lens 1121 in a fast-axis collimating lens holder 1124, and fixing the fast-axis collimating lens holder 1124 to the base 20; providing an emission plate assembly 1112 fixed to the emission plate 1111 in the emission plate mounting base 1113 on the base 20, and adjusting the emission plate 1111, to observe quality of an outgoing light beam collimated along the fast axis; and disposing the slow-axis collimating lens 1122 in the slow-axis collimating lens holder 1125, providing the slow-axis collimating lens holder 1125 in the base 20, adjusting a position of the slow-axis collimating lens 1122 based on quality of a light spot on a display, and fixing the slow-axis collimating lens holder 1125 to the base 20.

Another mounting and adjustment method includes: disposing the fast-axis collimating lens 1121 in the fast-axis collimating lens holder 1124, and disposing the slow-axis collimating lens 1122 in the slow-axis collimating lens holder 1125; providing the fast-axis collimating lens holder 1124 and the slow-axis collimating lens holder 1125 on the base 20, adjusting a distance between the fast-axis collimating lens holder 1124 and the slow-axis collimating lens holder 1125, and aligning optical axes of the fast-axis collimating lens 1121 and the slow-axis collimating lens 1122; and then fixing the fast-axis collimating lens holder 1124 and the slow-axis collimating lens holder 1125 to the base 20. FIG. 8 is a schematic structural diagram of a base holding a fast-axis collimating lens holder and a slow-axis collimating lens holder. Then an emission plate assembly 1112 fixed to the emission plate 1111 is provided in the emission plate mounting base 1113 on the base 20, and positions of the emission plate 1111 and the collimating element 112 are adjusted, to observe quality of an outgoing light beam collimated along the fast and slow axes. When the positions of the emission plate 1111 and the collimating element 112 satisfy a condition that a divergence angle of the collimated outgoing light beam is not greater than the preset divergence angle threshold, the emission plate 1111 is fixed to the base 20.

When the collimating element includes a fixing base, the mounting and adjustment method includes: disposing the fast-axis collimating lens 1121 in the fast-axis collimating lens holder 1124, disposing the slow-axis collimating lens 1122 in the slow-axis collimating lens holder 1125, adjusting a distance between the fast-axis collimating lens holder 1124 and the slow-axis collimating lens holder 1125, and aligning optical axes of the fast-axis collimating lens 1121 and the slow-axis collimating lens 1122; and then fixing the fast-axis collimating lens holder 1124 and the slow-axis collimating lens holder 1125 to the fixing base. Then the fixing base fixed to the fast-axis collimating lens holder 1124 and the slow-axis collimating lens holder 1125 is fixed to the base 20. Then an emission plate assembly 1112 fixed to the emission plate 1111 is provided in the emission plate mounting base 1113 on the base 20, and positions of the emission plate 1111 and the collimating element 112 are adjusted, to observe quality of an outgoing light beam collimated along the fast and slow axes. When the positions of the emission plate 1111 and the collimating element 112 satisfy a condition that a divergence angle of the collimated outgoing light beam is not greater than the preset divergence angle threshold, the emission plate 1111 is fixed to the base 20.

In some embodiments, bases 20 may include a first base and a second base. The first base is configured to fix the emission apparatus 111 and the collimating element 112, that is, integrate the emission apparatus 111 and the collimating element 112 into the emission module 11. The first base is fixed to the second base, and the second base is also configured to mount other components in the transceiver component 10, such as a beam splitting module 12, a receiving module 13, or the like.

The beam splitting module 12 allows the outgoing laser to pass through the beam splitting module 12 for emission, and also deflects the coaxially-incident reflected laser toward the receiving module 13. Optionally, the beam splitting module 12 may include: a reflector with a central aperture, a polarization beam splitter, a polarization beam splitting plate, a combined beam splitter (a polarization beam splitting plate is arranged at the central aperture of the reflector), and the like.

Optionally, the receiving module 13 may include a detector and a focusing module, where the focusing module is configured to focus reflected lasers, and the detector is configured to receive the reflected lasers focused by the focusing module. Optionally, the focusing module may include at least one of the following: a ball lens, a group of ball lenses, and a group of cylindrical lens. Optionally, the detector may be an Avalanche Photo Diode (APD), a Silicon Photomultiplier (SiPM), an APD array, a Multi-Pixel Photon Counter (MPPC), a Photomultiplier Tube (PMT), a Single-Photon Avalanche Diode (SPAD), or the like.

The cylindrical lens is used, and therefore, the two axes do not affect each other, light is easy to adjust, and there is no mutual coupling between the two axes.

Figure 12:
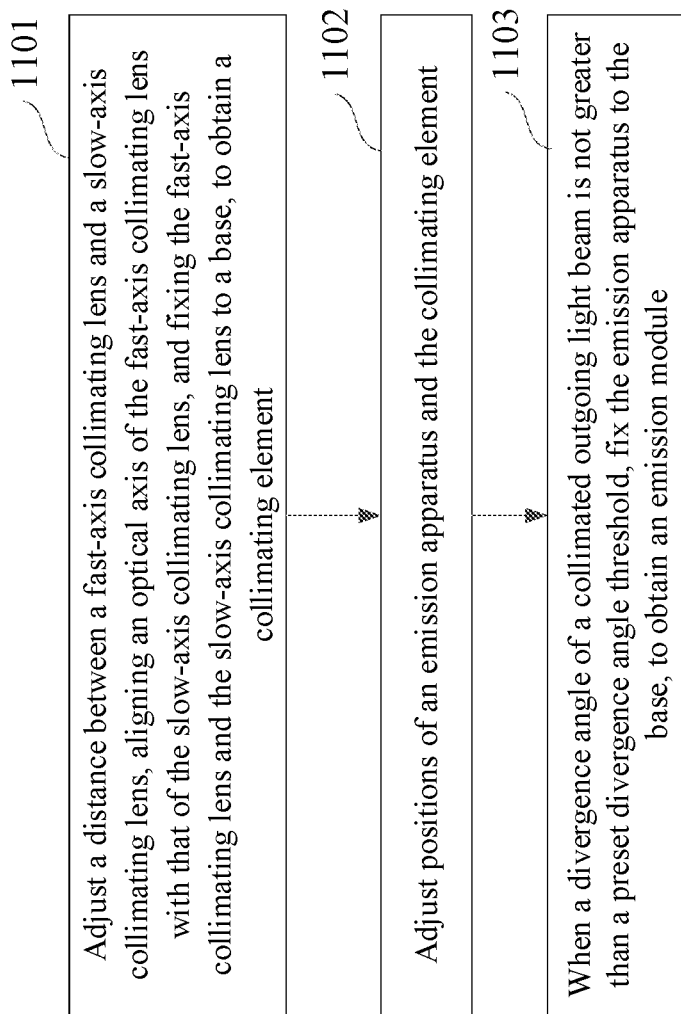
FIG. 12 is a flowchart of a mounting and adjustment method of an emission module according to an embodiment of the present invention.

FIG. 12 is a flowchart of a mounting and adjustment method of an emission module according to an embodiment of the present invention. As shown in FIG. 12, the method is applied to the emission module in the foregoing embodiments, and the method includes the following steps:

Step 1101: Adjust a distance between a fast-axis collimating lens and a slow-axis collimating lens, align an optical axis of the fast-axis collimating lens with that of the slow-axis collimating lens, and fix the fast-axis collimating lens and the slow-axis collimating lens to the base, to obtain the collimating element.

Step 1102: Adjust positions of an emission apparatus and the collimating element.

Step 1103: When a divergence angle of the collimated outgoing light beam is not greater than a preset divergence angle threshold, fix the emission apparatus to the base, to obtain an emission module.

In this embodiment of the present invention, positions of the fast-axis collimating lens and the slow-axis collimating lens are fixed oppositely, the fast-axis collimating lens and the slow-axis collimating lens are integrated into the collimating element, and then the positions of the emission apparatus and the collimating element are adjusted. When specific positions meet the condition that the divergence angle of the collimated outgoing light beam is not greater than the preset divergence angle threshold, the emission apparatus and the collimating element are fixed to the base, to obtain a modular emission module. It is convenient to apply the emission module to LiDAR products, and to mount and adjust the emission module, thereby implementing high mounting and adjustment efficiency. Because only one lens is used for either of the fast and slow axes, mounting and adjustment is easy to implement. Because the aspherical cylindrical lens is used for the fast axis and the spherical cylindrical lens is used for the slow axis, the collimating effect is good. Because cylindrical lenses are used for both the fast and slow axes, the two axes do not interfere with each other, the light is easy to adjust, and there is no mutual coupling between the two axes.

Figure 13:
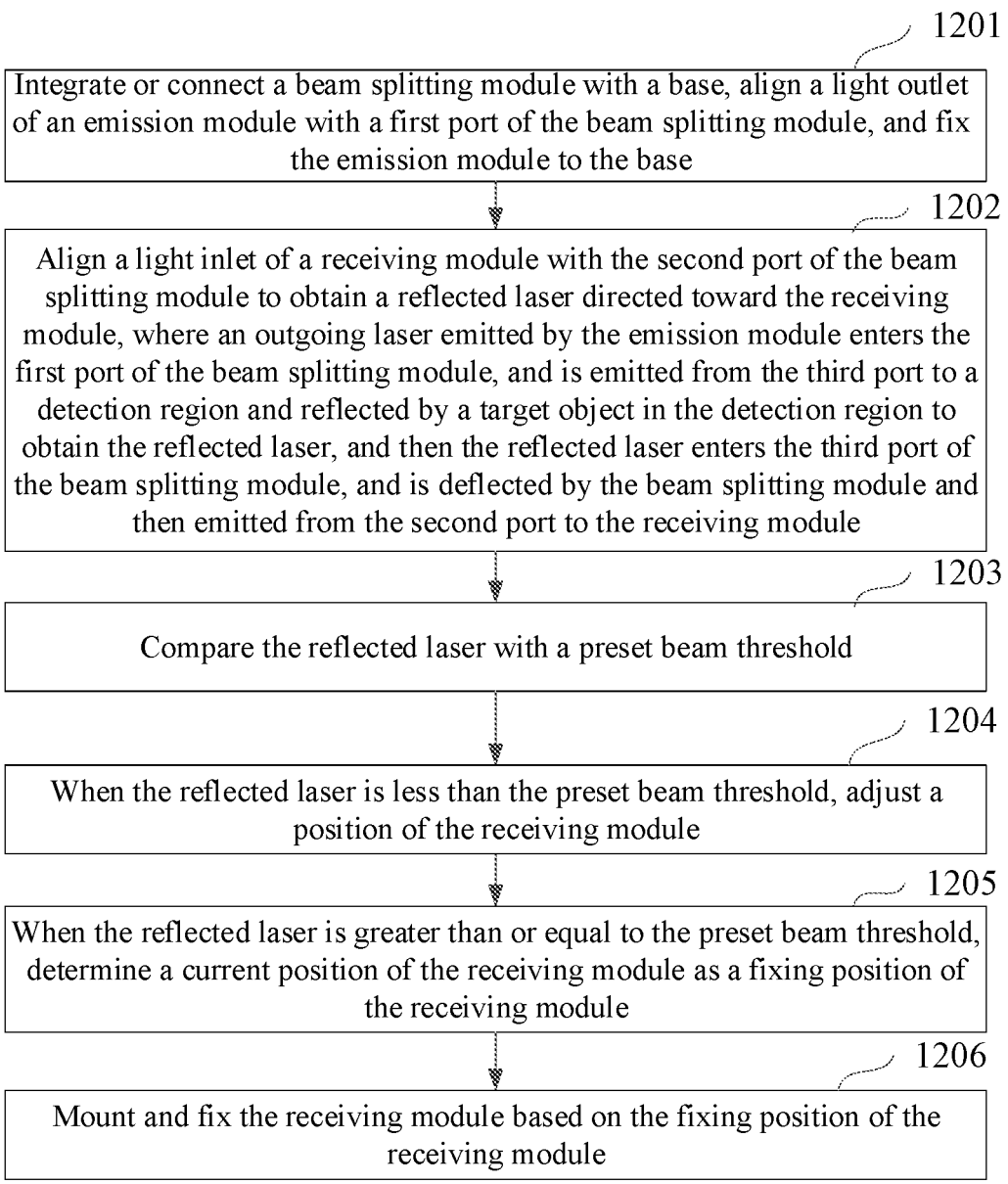
FIG. 13 is a flowchart of a mounting and adjustment method of a LiDAR according to an embodiment of the present invention.

FIG. 13 is a flowchart of a mounting and adjustment method of a LiDAR according to an embodiment of the present invention. As shown in FIG. 13, the method is applied to the LiDAR in the foregoing embodiments, and the method may include the following steps:

Step 1201: Integrate or connect a beam splitting module with a base, align a light outlet of an emission module with a first port of the beam splitting module, and fix the emission module to the base.

Specifically, when a transceiver component is mounted and adjusted, the beam splitting module and the base are integrated or non-detachably fixed, and then a light outlet of the emission module is aligned with the first port of the beam splitting module, and may be mounted and fixed on the base by means of a buckle, a screw, a pin, an adhesive, or the like.

Step 1202: Align a light inlet of a receiving module with the second port of the beam splitting module to obtain a reflected laser directed toward the receiving module, where an outgoing laser emitted by the emission module enters the first port of the beam splitting module, and is emitted from the third port to a detection region and reflected by a target object in the detection region to obtain the reflected laser, and then the reflected laser enters the third port of the beam splitting module, and is deflected by the beam splitting module and then emitted from the second port to the receiving module.

Before the LiDAR is mounted and adjusted, a target can be preset as the target object, and a distance between the target and the LiDAR is known.

Specifically, the detector of the receiving module can be configured to obtain the reflected laser. The outgoing laser emitted by the emission module enters the first port of the beam splitting module, and is emitted from the third port to the detection region and reflected by a target object in the detection region to obtain the reflected laser, and then the reflected laser enters the third port of the beam splitting module, and is emitted from the second port to the receiving module. A receiving optical path and an emission optical path between the beam splitting module and the target object are coaxial.

Step 1203: Compare the reflected laser with a preset beam threshold.

The preset beam threshold may be a preset voltage signal threshold or a preset current signal threshold.

Specifically, after the detector obtains the reflected laser, the beam can be converted into a voltage signal or a current signal, and then the voltage signal can be compared with the preset voltage signal threshold, or the current signal can be compared with the preset current signal threshold.

Step 1204: When the reflected laser is less than the preset beam threshold, adjust a position of the receiving module.

An example in which the reflected laser is converted into a voltage signal on the detector is used for description. When a comparison result obtained by the detector indicating that the voltage signal is less than the preset voltage signal threshold, the LiDAR can adjust the position of the detector in the transceiver component 10, and that is, adjust the position of the receiving module, so that the voltage signal obtained by the detector meets a requirement.

Step 1205: When the reflected laser is greater than or equal to the preset beam threshold, determine a current position of the receiving module as a fixing position of the receiving module.

The fixing position refers to a position at which the receiving module is fixed, and the receiving effect is optimal when the receiving module is provided at this position.

An example in which the reflected laser is converted into a voltage signal on the detector is still used for description. When the comparison result obtained by the detector indicates that the voltage signal is greater than or equal to the preset voltage signal threshold, the LiDAR can determine the current position of the detector as the fixing position of the detector, that is, it is possible to determine the current position of the receiving module as the fixing position of the receiving module.

Step 1206: Mount and fix the receiving module based on the fixing position of the receiving module.

Specifically, the receiving module is fixed to the beam splitting module based on the fixing position, and a connection between the receiving module and the beam splitting module may be a connection manner such as a buckle, a screw, a pin, or an adhesive.

FIG. 14 is a schematic structural diagram of a LiDAR according to an embodiment of the present invention. As shown in FIG. 14, based on the foregoing embodiments, the transceiver component 10 in the LiDAR 100 in this embodiment of the present invention further includes a reflector module 14. The reflector module 14 is provided between the beam splitting module 12 and the receiving module 13, and the reflected laser passes through the beam splitting module 12 and then is reflected by the reflector module 14 toward the receiving module 13.

An optical axis of the reflected laser passing through the reflector module 14 can be parallel to an optical axis of the emitted beams, or there can be a specific angle between the optical axis of the reflected laser and the optical axis of the emitted beams. This is not limited in this embodiment, provided that the reflected laser passing through the reflector module 14 can enter the receiving module 13. Therefore, the receiving optical path is folded and compressed, reducing a length of occupied space and an occupied volume.

Specifically, the outgoing laser emitted by the emission module 11 is emitted to the detection region after passing through the beam splitting module 12. The outgoing laser is reflected by the target object 200 in the detection region to obtain the reflected laser. After entering the beam splitting module 12, the reflected laser is directed at the reflector module 14, and then reflected by the reflector module 14 toward the receiving module 13, and finally, the reflected laser is received by the receiving module 13.

The mounting and adjustment method of a LiDAR provided in this embodiment may include the following steps:

Step 1301: Integrate or connect a beam splitting module with a base, align a light outlet of an emission module with a first port of the beam splitting module, and fix the emission module to the base.

Step 1302: Align and fix a light inlet of a reflector module with the second port of the beam splitting module, and align and fix a light inlet of the receiving module with a light outlet of the reflector module, to obtain a reflected laser directed toward the receiving module, where an outgoing laser emitted by the emission module enters the first port of the beam splitting module, and is emitted from the third port to a detection region and reflected by a target object in the detection region to obtain the reflected laser, and then the reflected laser enters the third port of the beam splitting module, and is deflected by the beam splitting module, then emitted from the second port, and reflected by the reflector module to the receiving module.

Step 1303: Compare the reflected laser with a preset beam threshold.

Step 1304: When the reflected laser is less than the preset beam threshold, adjust a position of a reflector in the reflector module.

Step 1305: When the reflected laser is greater than or equal to the preset beam threshold, determine a current position of the reflector in the reflector module as a fixing position.

Step 1306: Mount and fix the reflector according to the fixing position of the reflector in the reflector module.

In this embodiment, the beam splitting module 12 includes: a beam splitter collimating element 121 and a beam splitter; and the beam splitter collimating element 121 is integrated or connected with the base 20, and the beam splitter is fixed to the beam splitter collimating element 121. The beam splitter collimating element 121 is a cubic structure, and a beam splitter mounting position is provided in the structure. The beam splitter is fixed to the beam splitter collimating element 121 at a preset tilt angle and position through the beam splitter mounting position. Optionally, the beam splitter collimating element 121 may be a preset structure at the same tilt angle as the beam splitter, and may be integrated or connected with the base 20, to ensure accuracy of the position when the beam splitter is mounted. A material of the beam splitter collimating element 121 can be the same as that of the base 20. When the beam splitter is mounted, the beam splitter only needs to be mounted on the beam splitter collimating element 121 correspondingly. A connection between the beam splitter and the beam splitter collimating element 121 can be a buckle connection, an adhesive connection, or the like. Optionally, the beam splitter may be a polarization beam splitter, a reflector with a central aperture, a semi-transparent and semi-reflective reflector, or the like.

The beam splitting module 12 may also include a secondary beam splitter. The secondary beam splitter is provided between the beam splitter and the collimating element 112. The secondary beam splitter is fixed by the beam splitter collimating element 121, a secondary beam splitter mounting position is provided in the beam splitter collimating element 121, and the secondary beam splitter is provided in the beam splitter collimating element 121 at a preset tilt angle and position through the secondary beam splitter mounting position, and is fixed by a lock block 122. Optionally, the secondary beam splitter may be a polarization beam splitter (PBS). The secondary beam splitter is added to the beam splitting module 12, so that intensity of polarized light emitted to the beam splitter can be scattered and local heating is reduced. When the secondary beam splitter is configured to filter out polarized light S, the polarized light S does not enter the receiving module 13 after being deflected, thereby avoiding influence of the filtered polarized light S on a receiving function of the receiving module 13, and improving detection performance and detection accuracy. In addition, even if the beam splitting module 12 does not include a secondary beam splitter, the beam splitting module 12 can still complete a beam transceiver function of the transceiver component 10, to meet a requirement for the detection performance.

The reflector module 14 may include a reflector collimating element 141 and a reflector; and the reflector is fixed by the reflector collimating element 141. The reflector module 14 may include at least one reflector, and the reflector may be a flat reflector, a cylindrical reflector, an aspherical curvature reflector, or the like. Optionally, the reflector module 14 further includes a reflector cover 142. The reflector is fixed on the reflector cover 142, and the reflector cover 142 is connected to the reflector collimating element 141, thereby fixing the reflector. A connection between the reflector cover 142 and the reflector collimating element 141 can be a buckle connection, an adhesive connection, or the like. Optionally, the beam splitter collimating element 121 and the reflector collimating element 141 are aligned and connected. A connection between the beam splitter collimating element 121 and the reflector collimating element 141 may be a connection manner such as a buckle, a screw, a pin, or an adhesive.

The receiving module 13 is aligned and then connected with the reflector collimating element 141. Specifically, the receiving module 13 includes a receiving plate (not shown in the figure) and a receiving plate base 131; and the receiving plate is fixed by the receiving plate base 131. Specifically, the transceiver component 10 further includes a focusing module 15, the focusing module 15 is provided between the receiving module 13 and the reflector module 14, and the reflected laser is focused by the focusing module 15 and directed toward the receiving module 13. The focusing module 15 includes a focusing lens barrel 151 and a focusing lens (not shown in the figure); the focusing lens is provided in the focusing lens barrel 151; and one end of the focusing lens barrel 151 is aligned with the light outlet of the reflector module 14, and the other end is aligned with the light inlet of the receiving module 13. A connection between the receiving module 13 and the focusing module 15 and a connection between the reflector module 14 and the focusing module 15 may be a connection manner such as a buckle, a screw, a pin, or an adhesive. The receiving plate of the receiving module 13 can be configured to obtain the reflected laser. Specifically, the receiving plate may include at least one detector such as APD, an APD array, MPPC, SPAD, and PMT SIPM. The receiving optical path and the emission optical path are coaxial.

Figure 15:
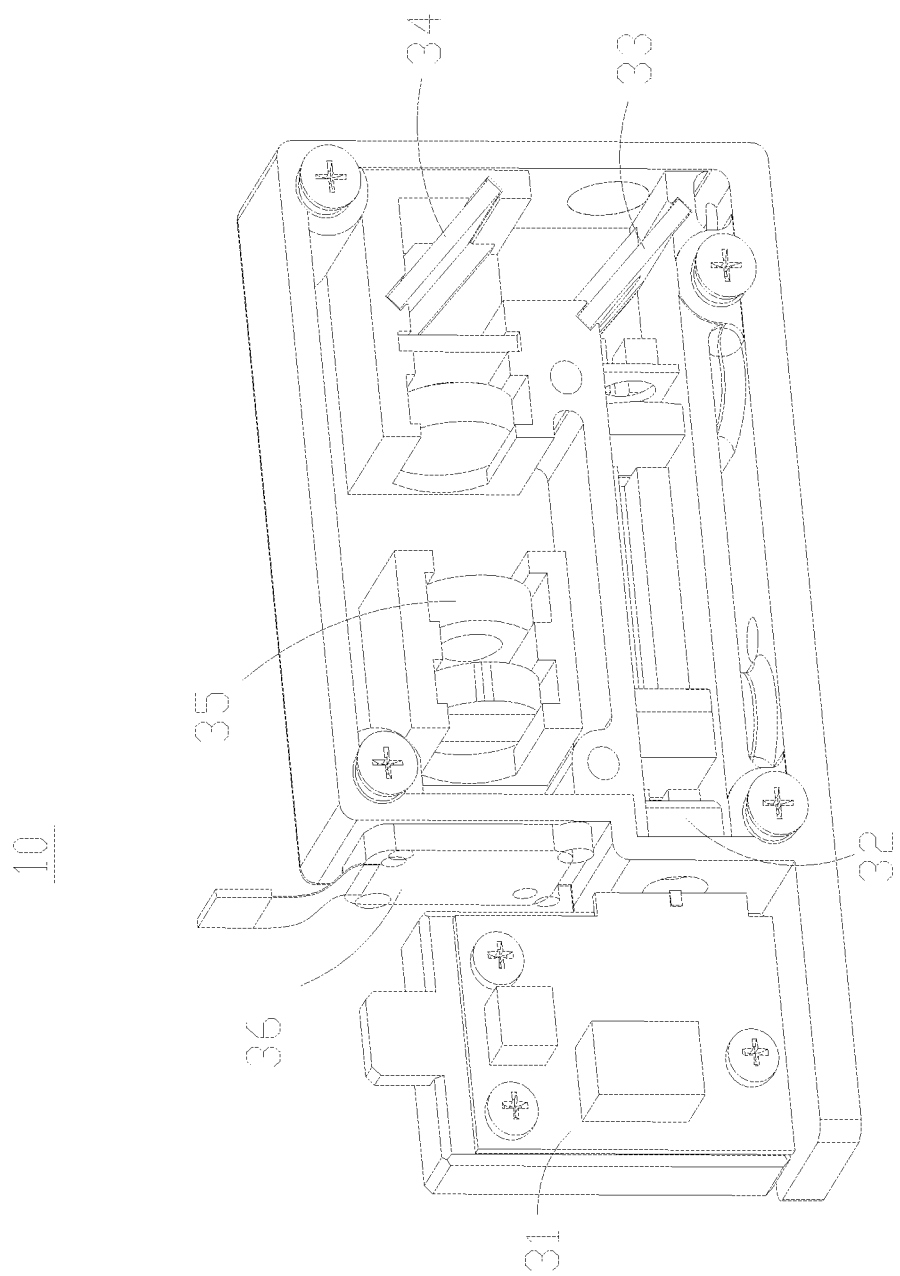
FIG. 15 is a schematic structural diagram of a LiDAR according to another embodiment of the present invention.

FIG. 15 is a schematic structural diagram of a transceiver component 10 according to another embodiment of the present invention. As shown in FIG. 15, the transceiver component 10 includes an emission module 31, an emission optical system 32, a beam splitting module 33, a reflector module 34, a receiving optical system 35, and a receiving module 36 provided sequentially along an outgoing laser. The emission module 31 includes an emission plate, and the emission plate is provided with an emitter for emitting the outgoing laser. The emission optical system 32 includes a collimating element, configured to collimate an outgoing laser emitted by an emitter. The beam splitting module 33 is configured to direct a passing outgoing laser toward the detection region, and deflect a reflected laser in a coaxial optical path with the outgoing laser toward the reflector module 34; the reflector module 34 is configured to receive the reflected laser reflected by the beam splitting module 12 and direct the reflected laser toward the receiving optical system 35; the receiving optical system 35 is used to focus the reflected laser, and direct the focused reflected laser toward the receiving module 36; and the receiving module 36 is configured to receive the reflected laser. The emission optical system 32, the beam splitting module 33, the reflector module 34, the receiving optical system 35, and the receiving module 36 are all provided in an integrated transceiver housing, and each device is positioned and fixed by a preset structure.

In this embodiment, for specific optical composition and structures of the emission module 31, the emission optical system 32, the beam splitting module 33, the reflector module 34, the receiving optical system 35, and the receiving module 36, reference may be made to the foregoing embodiments. Specifically, for optical composition and structure of the emission module 31, reference may be made to the emission apparatus 111 in the foregoing embodiments; for optical composition and structure of the emission optical system 32, reference may be made to the collimating element 112 in the foregoing embodiments; for optical composition and structure of the beam splitting module 33, reference may be made to the beam splitting module 12 in the foregoing embodiments; for optical composition and structure of the reflector module 34, reference may be made to the reflector module 14 in the foregoing embodiments; for optical composition and structure of the receiving optical system 35, reference may be made to the focusing module 15 in the foregoing embodiments; and for optical composition and structure of the receiving module 36, reference may be made to the receiving module 13 in the foregoing embodiments. Details are not described herein again.

In this embodiment, the emission module 31 is provided as a module in a transceiver housing. The emission optical system 32, the beam splitting module 33, the reflector module 34, the receiving optical system 35 and the receiving module 36 each are provided in an integrated transceiver housing. As an independent module, the foregoing modular design facilitates modular application, light adjustment, mounting, and replacement.

Another embodiment of the present invention also provides a LiDAR, which includes the transceiver assembly 10 and the scanning module in the foregoing embodiment, and the scanning module may be a MEMS (Micro-electromechanical System) mirror. The LiDAR also includes a refractor module, including a plurality of refractors, and each refractor is provided in a one-to-one correspondence with a transceiver assembly 10. An outgoing laser of a transceiver module 300 is directed toward a corresponding refractor, and then directed to the MEMS mirror after being reflected by the refractor. The MEMS mirror emits the outgoing laser to the detection region and performs scanning. A reflected laser reflected by an object in the detection region returns and is received by the MEMS mirror and directed toward the refractor, the refractor reflects the reflected laser to the corresponding transceiver component 10, and the transceiver component 10 receives the reflected laser.

Further, based on the foregoing LiDAR, an embodiment of the present invention provides a smart sensing device including the LiDAR in the foregoing embodiments. The smart sensing device can be a vehicle, a UAV, a robot, or other related devices that uses the LiDAR for smart sensing and detection.

Finally, it should be noted that the foregoing embodiments are intended for describing instead of limiting the technical solutions of the present invention. Although the present invention is described in detail with reference to the foregoing embodiments, the person skilled in the art should understand that modifications may be made to the technical solutions described in the foregoing embodiments or equivalent replacements may be made to some or all technical features thereof, without departing from the scope of the technical solutions. All these modifications or replacements shall fall within the scope of the claims and specification of the present invention. Particularly, the technical features mentioned in all embodiments may be combined in any manner, provided that no structural conflict occurs. The present invention is not limited to the specific embodiments disclosed in this specification, but includes all technical solutions that fall within the scope of the claims.

What is claimed is:

1. An emission module, comprising:
an emission apparatus and a collimating element provided sequentially along an outgoing laser,
wherein the emission apparatus is configured to generate the outgoing laser, and the collimating element is configured to collimate the outgoing laser generated by the emission apparatus and emit the outgoing laser; and the collimating element comprises:
a fast-axis collimating element and a slow-axis collimating element provided sequentially along the outgoing laser,
wherein the fast-axis collimating element is configured to receive the outgoing laser generated by the emission apparatus and collimate the outgoing laser in a fast-axis direction, and
wherein the slow-axis collimating element is configured to receive the outgoing laser collimated in the fast-axis direction, collimate the outgoing laser in the slow-axis direction, and emit the outgoing laser;
wherein the fast-axis collimating element comprises a fast-axis collimating lens, and the slow-axis collimating element comprises a slow-axis collimating lens; wherein the fast-axis collimating lens is an aspherical cylindrical lens, and the slow-axis collimating lens is a spherical cylindrical lens; a generatrix direction of the fast-axis collimating lens is perpendicular to a generatrix direction of the slow-axis collimating lens;
wherein the fast-axis collimating lens is provided in a fast-axis collimating lens holder; and
wherein the slow-axis collimating lens is provided in a slow-axis collimating lens holder,
wherein the fast-axis collimating lens holder comprises a first vertical plate, and
wherein a first mounting aperture for vertically providing the fast-axis collimating lens is arranged on the first vertical plate;
wherein the fast-axis collimating lens holder further comprises a first side baffle, a second side baffle, and a top baffle that extend perpendicular to the first vertical plate, and
wherein the first side baffle, the top baffle, and the second side baffle are sequentially connected, to form a hollow framework;
wherein the slow-axis collimating lens holder comprises a second vertical plate, and a second mounting aperture for vertically providing the fast-axis collimating lens is arranged on the second vertical plate;
wherein the slow-axis collimating lens holder further comprises a third side baffle and a fourth side baffle that extend perpendicular to the second vertical plate, and
wherein the third side baffle, the second vertical plate, and the fourth side baffle are sequentially connected, to form a framework of a U-shape.

2. The emission module according to claim 1, wherein a capability of the fast-axis collimating lens for focusing outgoing lasers is greater than a capability of the slow-axis collimating lens for focusing outgoing lasers.

3. The emission module according to claim 1, wherein the emission module further comprises a base, and
wherein both the fast-axis collimating lens holder and the slow-axis collimating lens holder are fixed to the base.

4. The emission module according to claim 1, wherein the fast-axis collimating lens holder further comprises a first fixing plate extending horizontally from a bottom of the first vertical plate, the first side baffle, and the second side baffle, and
wherein the first fixing plate connects the fast-axis collimating lens holder to the base.

5. The emission module according to claim 1, wherein the fast-axis collimating lens holder further comprises a pressing plate, and
wherein the pressing plate is provided in front of the first mounting aperture and is configured to fix the fast-axis collimating lens.

6. The emission module according to claim 3, wherein the slow-axis collimating lens holder further comprises a third fixing plate extending horizontally from a bottom of the second vertical plate, and
wherein the third fixing plate connects the slow-axis collimating lens holder to the base.

7. The emission module according to claim 3, wherein the collimating element further comprises a fixing base, and
wherein the fast-axis collimating lens and the slow-axis collimating lens are fixed to the fixing base, and are fixed to the base through the fixing base.

8. The emission module according to claim 3, wherein the emission apparatus comprises an emission plate assembly and an emission plate mounting base,
wherein the emission plate assembly is fixed to the emission plate mounting base, and
wherein the emission plate assembly is fixed to the base through the emission plate mounting base.

9. The emission module according to claim 8, wherein the emission plate assembly comprises an emission plate, an emission plate adjustment cover, and an emission plate adjustment base, wherein the emission plate adjustment cover and the emission plate adjustment base clamp the emission plate, wherein the emission plate mounting base is provided with a mounting rail matching the emission plate adjustment base of the emission plate assembly, and
wherein the emission plate assembly is mounted in the mounting rail and fixed to the emission plate mounting base.

10. A mounting and adjustment method of an emission module, wherein the method is applied to the foregoing emission module according to claim 1, and the method comprises:
adjusting a distance between the fast-axis collimating lens and the slow-axis collimating lenses, aligning an optical axis of the fast-axis collimating lens with that of the slow-axis collimating lens, and fixing the fast-axis collimating lens and the slow-axis collimating lens to the base, to obtain the collimating element;
adjusting positions of the emission apparatus and the collimating element; and when a divergence angle of the collimated outgoing light beam is not greater than a preset divergence angle threshold, fixing the emission apparatus to the base, to obtain an emission module.

11. A LiDAR, comprising an emission module according to claim 1, a beam splitting module, and a receiving module,
wherein the emission module is configured to emit a collimated outgoing laser, wherein the beam splitting module is configured to enable the outgoing laser to be emitted into a detection region after passing through, and deflect a reflected laser in a coaxial optical path with the outgoing laser toward the receiving module, and wherein the receiving module is configured to receive the reflected laser.

* * * * *